July 18, 1933.   S. G. WINGQUIST   1,918,677
DOUBLE ROW ROLLER BEARING
Filed Nov. 27, 1931
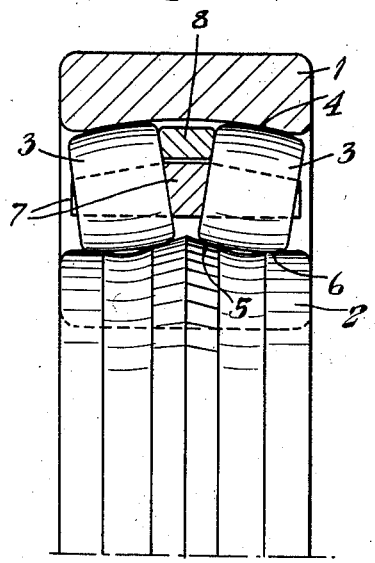
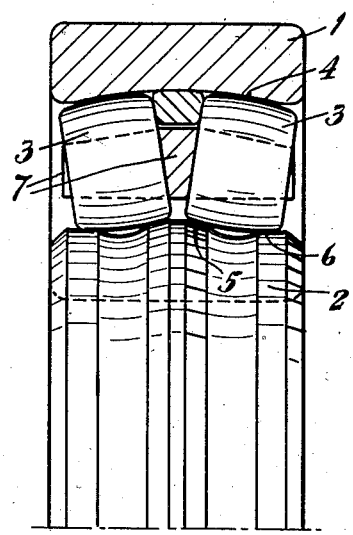
Inventor:
Sven Gustaf Wingquist
By his Attorneys.

Patented July 18, 1933

1,918,677

UNITED STATES PATENT OFFICE

SVEN GUSTAF WINGQUIST, OF SKARA, SWEDEN

DOUBLE-ROW ROLLER BEARING

Application filed November 27, 1931, Serial No. 577,570, and in Sweden September 11, 1931.

This invention relates to double-row roller bearings, particularly of the self-adjusting type, having a guide ring for the rollers arranged between the roller rows.

The invention has for its object to effectively prevent displacement of the rollers out of their correct position, i. e. to prevent turning of the rollers about an axis directed towards the bearing axis perpendicular to the axis of the roller, and also to simplify the construction and the mounting of such bearings.

The invention consists substantially in this that the guide ring provided between the rows of rollers has a greater outer diameter than the inner diameter at the edges of the outer bearing ring and is made resilient, so that it by being compressed can be introduced into the bearing past the inner edge of the outer bearing ring.

In the annexed drawing Figs. 1 and 2 show two forms of embodiment of an arrangement according to this invention, both figures showing axial sections of bearings of the self-adjusting type having a spherical outer race.

In the drawing, 1 designates the outer bearing ring having a spherical race, 2 the inner bearing ring and 3 the rollers provided in two rows therebetween, said rollers having each one point of contact 4 at the outer bearing ring 1 and two points of contact 5 and 6 at the inner bearing ring 2. The rollers 3 are placed in a cage 7 in the ordinary manner.

In the form of embodiment shown in Fig. 1, a guide ring 8 is placed between the two rows of rollers in the space outside the cage 7, said guide ring 8 having according to the invention a greater outer diameter than the inner diameter at the edges of the outer bearing ring and being made resilient, so that it by being compressed can be introduced into the bearing past the inner edge of the outer bearing ring. The introduction of the guide ring is performed in such manner that the said ring is placed in a plane perpendicular to the plane of the bearing ring and is compressed into an oval shape and is moved into the bearing ring, the guide ring being then free to be swung into alignment with the bearing ring. In the present form of embodiment the guide ring 8 is arranged to rest (float) upon the rollers, without taking up any considerable axial pressure. The guide ring may, if desired, instead be carried by the roller cage 7.

In the form of embodiment according to Fig. 2 the guide ring 8 rests against the spherical race of the outer bearing ring 1, whereby the roller cage 7 may be mounted in the guide ring. The introduction of the guide ring is performed in the same way as in the form of embodiment according to Fig. 1.

In order to further assure of a correct position of the rollers 3 and to prevent bending between the rollers and the intermediate guide ring 8, the end surfaces of the rollers bearing against said ring may be spherical with the centers located on the geometrical axis of the bearing. The side surfaces of the ring 8 may in such case be conical or channel-shaped (torus-shaped) having a contour corresponding to the spherical end surfaces of the rollers.

What I claim is:—

1. A double-row roller bearing comprising an integral outer bearing ring having an internal surface of which the portion of greatest diameter is intermediate its marginal portions to serve as a roller race, an inner bearing ring, two rows of rollers mounted between said rings, and a guide ring in the space between said bearing rings to separate the inner ends of the rollers of the two rows, said guide ring having an external diameter greater than the least diameter of the outer bearing ring at either side of the guide ring, the guide ring being sufficiently flexible to permit it to be inserted in the outer bearing ring with the axes of the two rings out of alignment and the guide ring then rotated to its normal position with respect to the bearing ring.

2. A roller bearing, as defined by claim 1, of which the guide ring is a floating element supported by engagement with the inner end surfaces of the rollers.

3. A roller bearing, as defined by claim 1, having a cage associated with its rollers, and of which the guide ring is a movable element closely surrounding the cage.

4. A roller bearing, as defined by claim 1, of which the guide ring is a movable element supported by the outer bearing ring.

SVEN GUSTAF WINGQUIST.